(12) United States Patent
Subramanian et al.

(10) Patent No.: US 7,873,707 B1
(45) Date of Patent: Jan. 18, 2011

(54) CLIENT-SIDE URL REWRITER

(75) Inventors: Sudha Subramanian, Bangalore (IN); Rajesh Thiagarajan, Tamil Nadu (IN)

(73) Assignee: Oracle America, Inc., Redwood City, CA (US)

( * ) Notice: Subject to any disclaimer, the term of this patent is extended or adjusted under 35 U.S.C. 154(b) by 1658 days.

(21) Appl. No.: 10/974,257

(22) Filed: Oct. 27, 2004

(51) Int. Cl.
G06F 15/16 (2006.01)

(52) U.S. Cl. ...................................... 709/219

(58) Field of Classification Search ................. 709/217, 709/203, 219
See application file for complete search history.

(56) References Cited

U.S. PATENT DOCUMENTS

| | | | | |
|---|---|---|---|---|
| 6,098,093 | A * | 8/2000 | Bayeh et al. | 709/203 |
| 6,785,707 | B2 | 8/2004 | Teeple | |
| 6,886,013 | B1 | 4/2005 | Beranek | |
| 7,058,699 | B1 | 6/2006 | Chiou et al. | |
| 7,099,927 | B2 | 8/2006 | Chiou et al. | |
| 7,200,644 | B1 | 4/2007 | Flanagan | |
| 7,333,990 | B1 * | 2/2008 | Thiagarajan et al. | 1/1 |
| 2001/0037292 | A1 * | 11/2001 | Vogt | 705/39 |
| 2003/0061515 | A1 * | 3/2003 | Kindberg et al. | 713/201 |
| 2004/0044768 | A1 | 3/2004 | Takahashi | |
| 2005/0010567 | A1 * | 1/2005 | Barth et al. | 707/3 |
| 2005/0086306 | A1 | 4/2005 | Lemke | |
| 2005/0132020 | A1 * | 6/2005 | Gorbet et al. | 709/217 |
| 2005/0138604 | A1 * | 6/2005 | Harrison | 717/121 |
| 2005/0235044 | A1 * | 10/2005 | Tazuma | 709/217 |
| 2005/0262357 | A1 * | 11/2005 | Araujo et al. | 713/182 |
| 2006/0031442 | A1 | 2/2006 | Ashley et al. | |
| 2006/0253452 | A9 * | 11/2006 | Kirsch et al. | 707/10 |

* cited by examiner

*Primary Examiner*—Nathan Flynn
*Assistant Examiner*—Chirag Patel
(74) *Attorney, Agent, or Firm*—Robert C. Kowert; Meyertons, Hood, Kivlin, Kowert & Goetzel, P.C.

(57) ABSTRACT

A system and method for client-side URL rewriting. In one embodiment the method comprises a client sending a request for content to a client proxy, wherein the request for content comprises a first URL. The client proxy may then rewrite the first URL and redirect the request for content to a reverse proxy server. In such an embodiment, the request for content may be sent to the client proxy based on a proxy configuration of the client. In a further aspect of the method above, rewriting the first URL with the client-side URL rewriter may comprise rewriting the request for content to a second URL, and including an indication of the first URL in the rewritten request for content. Furthermore, the first URL may correspond to an intranet server, while the second URL may correspond to the reverse proxy server.

23 Claims, 4 Drawing Sheets

CLIENT-SIDE URL REWRITER

BACKGROUND OF THE INVENTION

1. Field of the Invention

This invention relates to the field of computer systems and, more particularly, to URL rewriting.

2. Description of the Related Art

As web-based applications become more important to business and industry, system failure becomes more expensive, and highly reliable systems assume a greater importance. For example, a web site may handle financial, production, sales, marketing or media applications. Failure to provide these applications to clients for even a few minutes could mean thousands or millions of dollars in lost income.

One key strategy used to protect web infrastructure from external attacks is the isolation of an organization's internal servers through the use of reverse proxies and firewalls. More particularly, the internal servers of an organization may be configured to only communicate via certain channels through a firewall to a reverse proxy computer. In turn, the reverse proxy may send and receive communications to the internal servers on behalf of one or more clients. Only the reverse proxy may be able to communicate directly with client systems via the Internet.

Accordingly, a reverse proxy may receive a request for a web page from a client system, relay the request to an internal server through the firewall, receive the web page back from the internal server, and return the web page to the client. To allow client systems from to access content or services from the internal server without directly exposing the internal server on a public network, the reverse proxy may rewrite the Universal Resource Locators (URLs) of the returned web page to point to a reverse proxy for the internal server instead of pointing to the internal server itself. For example, the reverse proxy may rewrite each URL that points to the internal server on a returned web page by rewriting the URL to point to the reverse proxy, and by including an indication of the URL of the intranet server in the rewritten URLs. Accordingly, the client system which receives the web page may access only the reverse proxy through the returned URLs.

However, configuring the reverse proxy at the server-side to rewrite every internal server URL sent to a client may be difficult and time-consuming. Furthermore, server-side URL rewriting may consume significant computational resources.

SUMMARY

A system and method for client-side URL rewriting is disclosed. In one embodiment the method comprises a client sending a request for content to a client-side URL rewriter, wherein the request for content may specify a first URL. The client-side URL rewriter may then rewrite the first URL and redirect the request for content to a reverse proxy server. In such an embodiment, the first URL may correspond to an intranet server, and the client may be configured so that all requests for content having a URL corresponding to the intranet server are sent to a client proxy comprising the client-side URL rewriter. The request for content may be sent to the client proxy based on a proxy auto-configuration (PAC) of a browser application on the client.

In a further aspect of the method above, rewriting the first URL with the client-side URL rewriter may comprise rewriting the first URL as a second URL and including an indication of the first URL. The first URL may correspond to an intranet server, and the second URL may correspond to the reverse proxy server.

In yet another aspect of the method above, the method may further comprise the reverse proxy server retrieving content from an intranet server in accordance with the request for content, and the reverse proxy server returning said content to the client. In still another aspect of the method above, redirecting the request for content to a reverse proxy server may comprise a client proxy comprising the client-side URL rewriter returning the rewritten first URL to a browser, and the client proxy sending a redirect command to the browser to redirect the request according to the rewritten URL.

Figure 1:
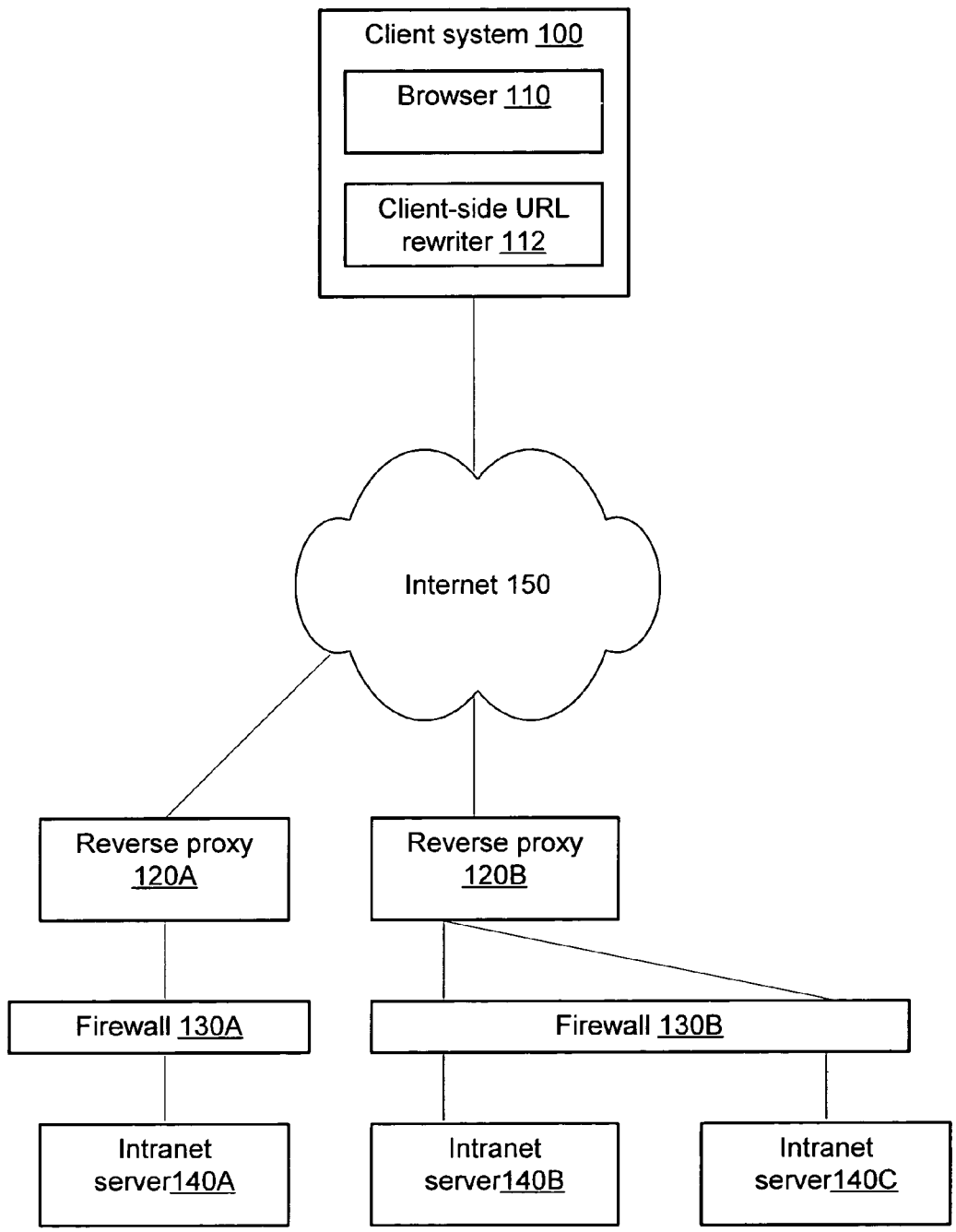
FIG. 1 is a block diagram of one embodiment of a reverse proxy and intranet system with a client-side URL rewriter.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Turning now to FIG. 1, an exemplary configuration of a client system 100, reverse proxies 120, and intranet servers 140 is shown. Client system 100 may be a laptop, desktop, server, workstation, palmtop, or other type of computer system. In one embodiment, client system 100 may include a browser 110 and a client-side URL rewriter 112, and may be directly connected to the Internet 150, or may be connected to the Internet 150 via a local area network (LAN) or wide area network (WAN) connection.

Each reverse proxy 120A-B may be a server or other type of computer system connected to the Internet 150 and intranet servers 140A-C via firewalls 130A-B. Intranet servers 140A-C may contain content, such as, for example, web pages or media files. Firewalls 130A-B may be operable to allow only authorized computer systems to communicate with intranet servers 140A-C. For example, in one embodiment, a firewall 130A-B may be operable to block all communications to intranet servers 140A-C which do not originate from reverse proxies 120A-B.

Each reverse proxy 120A-B may be operable to receive requests for content from other computer systems via the Internet 150. Each reverse proxy 120A-B may then be operable to relay a request for content to an intranet server 140A-C through a firewall 130A-B, and to receive content returned in response to the request from intranet servers 140A-C. Reverse proxies 120A-B may then be able to relay the returned content to the computer system which originated the request. It is noted that, in accordance with the above description, reverse proxy 120 A-B may be able to access content on intranet servers 140A-C on behalf of client system 100 without directly exposing intranet servers 140A-C to external connections, thereby providing intranet servers 140A-C with a greater degree of security from external attacks.

In one embodiment, client-side URL rewriter 112 may be a program configured as a client proxy for requests directed towards one or more intranet servers 140A-C. Client-side URL rewriter 112 may further be configured to rewrite the URLs of one or more content requests to redirect browser 110 to reverse proxies 120A-B rather than intranet servers 140A-C.

It is further noted that in various embodiments, additional firewalls 130 may be used in addition to or in place of firewalls 130A-B. For example, in one embodiment firewalls 130A-B may be positioned between Internet 150 and reverse proxy 120A-B. Likewise, in one embodiment a firewall 130 may be placed between client system 100 and Internet 150. In still further embodiments, no firewalls may be used.

Figure 2:
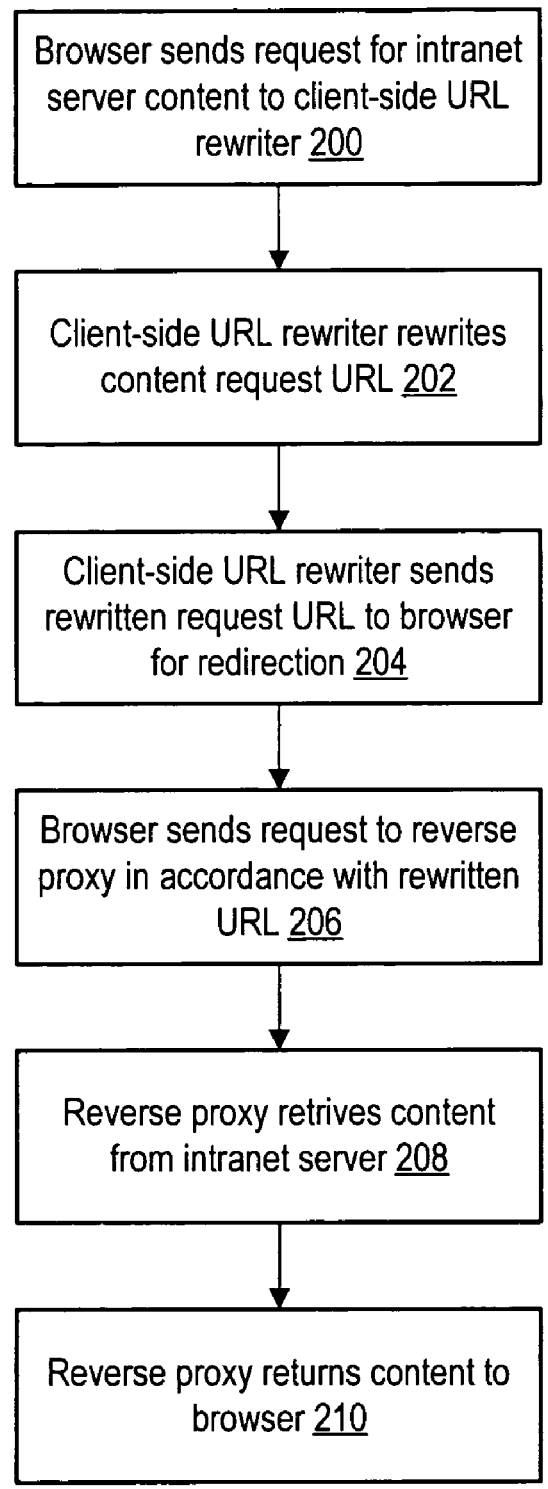
FIG. 2 is a flowchart illustrating one embodiment of a method for client-side rewriting of request URLs.

Turning now to FIG. 2, a flow diagram of a method for rewriting request URLs with a client-side URL rewriter is shown. In 200, browser 110 sends a request for content on an intranet server 140A-C to client-side URL rewriter 112. For example, in one embodiment browser 110 may send a request to intranet server 140A with the URL "http://intranet.sun.com/login.html". (Please note that spaces have been added to the example URL to prevent automatic hyperlink creation in online copies of this text.)

It is noted that, in one embodiment, browser 110 may be configured to route all requests for a particular URL to client-side URL rewriter 112. In one embodiment, browser 110 may utilize proxy settings, such as a Proxy Auto-Configuration (PAC), to determine a client proxy for a specific URL domain. The client proxy may include the client-side URL rewriter 112.

In 202, client-side URL rewriter 112 may rewrite the URL of the content request. More particularly, in one embodiment client-side URL rewriter 112 may rewrite the content request URL to point to a reverse proxy 120A-B and include an indication or encoding of the URL for an intranet server 140A-C. In one embodiment client-side URL rewriter 112 may rewrite the content request URL by prepending the URL of a reverse proxy 120A-B to the URL of the original request. For example, the URL "http://iintranet.sun.com/login.html" may become "http://wwww.sun.com/http://intranet.sun.com/login.html".

Alternatively, in other embodiments client-side URL rewriter 112 may rewrite the content request URL to point to the URL of reverse proxy 120A-B, and also include a mapping of the URL of intranet server 140A-C. For example, the URL "http://intranet.sun.com/login.html" may become "http://wwww.sun.com/host1/login.html", wherein "host1" is mapped to "http://intranet.sun.com" at the reverse proxy. In still further embodiments, client-side URL rewriter 112 may rewrite the content request URL to point to the URL of reverse proxy 120A-B, and further utilize encryption or other mechanisms to include an indication of the URL of intranet server 140A-C in the rewritten content request URL. For example, the URL "http://intranet.sun.com/login.html" may become "http://wwww.sun.com/?Fetch=joqdapedh...hetzkwq", wherein "joqdapedh...hetzkwq" is an encrypted or encoded string which decodes as "http://intranet.sun.com/login.html".

In 204, client-side URL rewriter 112 may then return the rewritten request URL to browser 110. In one embodiment, the rewritten URL may be sent back to the browser with a redirect response code. A redirect response sent along with the URL code may cause a browser to send a new request for the URL. For example, as described above, client-side URL rewriter 112 may redirect a request to reverse proxy 120A-B.

In 206, browser 110 may send a request to reverse proxy 120A-B, as indicated by the rewritten URL and response code. For example, if browser 110 receives the URL "http://www.sun.com/http://intranet.sun.com/login.html" along with a redirect response code from client-side URL rewriter 112, browser 110 may then send a request for the rewritten URL to reverse proxy 120A-B, where "sun.com" is the URL for the reverse proxy. It is noted that, in one embodiment, browser 112 may only be configured to send requests for intranet servers 140 to client-side URL rewriter 112 (or to a client proxy including rewriter 112). Requests sent to other servers, such as reverse proxy servers 120A-B, may be sent directly to the requested server or through a different proxy. Accordingly, the redirected request may be sent directly to reverse proxy server 120A-B, thereby avoiding an infinite loop of return and redirect.

In 208, reverse proxy 120A-B retrieves the requested content from the appropriate intranet server 140A-C. More particularly, reverse proxy 120A-B may strip the prepended URL from the request sent by browser 110, leaving only the URL of the content on intranet server 140A-C. Reverse proxy 120A-B may then be operable to retrieve content from intranet server 140A-C through firewall 130A-B, as described above. In 110, reverse proxy 120A-B returns the retrieved content to browser 110. In one embodiment, the method may return to 100 if and when browser 110 requests additional content from intranet servers 140A-C.

It is noted that, in accordance with the above description, URLs directed towards intranet servers 140A-C may be rewritten by client-side URL rewriter 112, rather than by server-side reverse proxies 120A-B. Accordingly, the intranet servers 140A-C may be protected without placing URL rewriting workloads on reverse proxies 120A-B. Furthermore, in some embodiments client-side URL rewriter 112 may be able to more efficiently rewrite client-side URLs by accessing local state information from browser 112, such as scripting variables.

Figure 3:
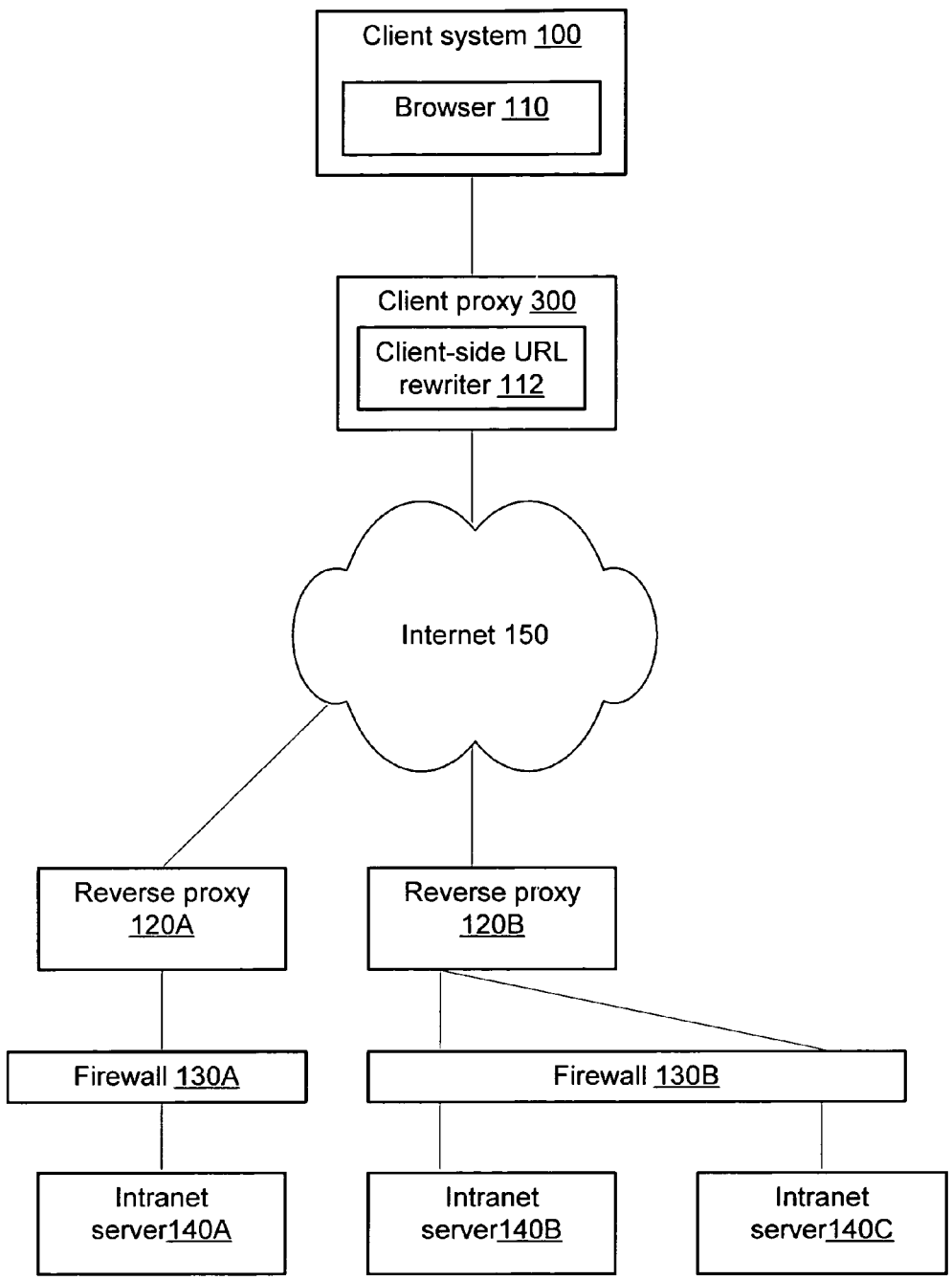
FIG. 3 is a block diagram of another embodiment of a reverse proxy and intranet system with a client proxy for client-side URL rewriting.

Turning now to FIG. 3, another exemplary configuration of a client system 100, reverse proxies 120, and intranet servers 140 is shown. Specifically, FIG. 3 illustrates one embodiment wherein client-side URL rewriter 112 executes on a client proxy 300. Client proxy 300 may be a computer system operable to receive requests from one or more client systems 100 and forward them to servers via the Internet 150. In other embodiments, client proxy 300 may be a process executing on the same computer as browser 110. In one embodiment, a firewall 130 may exist between client system 100 and client proxy 300, between client proxy 300 and Internet 150, or both. Client proxy 300 may also be configured to include client-side URL rewriter 112 to rewrite requests from browser 110, as described in FIG. 2 above.

In one embodiment, client proxy 300 may have client-side URL rewriter 112 already installed by a system administrator. Alternatively, in another embodiment client-side URL rewriter 112 may be a Java applet or Active X component, for example, downloaded from reverse proxy 120A-B. More particularly, reverse proxy 120A-B may be configured to return client-side URL rewriter 112 in response to an initial request for content, such as a request for an index page. Client-side URL rewriter 112 may then be operable to act as a client proxy for requests directed to intranet servers 140A-C, as described above in FIG. 2.

It is further noted that, in one embodiment, the functionality of client-side URL rewriter 112 may be integrated or hooked into browser 110. In such an embodiment, browser 110 (or a component hooked into browser 110) may be configured to detect any URL request directed towards an intranet server 140A-C, and to automatically rewrite the content request URL as described above. Furthermore, in such an embodiment browser 110 may not utilize a redirect response code, and may instead send the rewritten URL directly to reverse proxy 120A-B. In one embodiment, the client-side URL rewriter functionality may be part of a plug-in for browser 110, while in another embodiment browser 110 may be rewritten and recompiled with the additional functionality.

Figure 4:
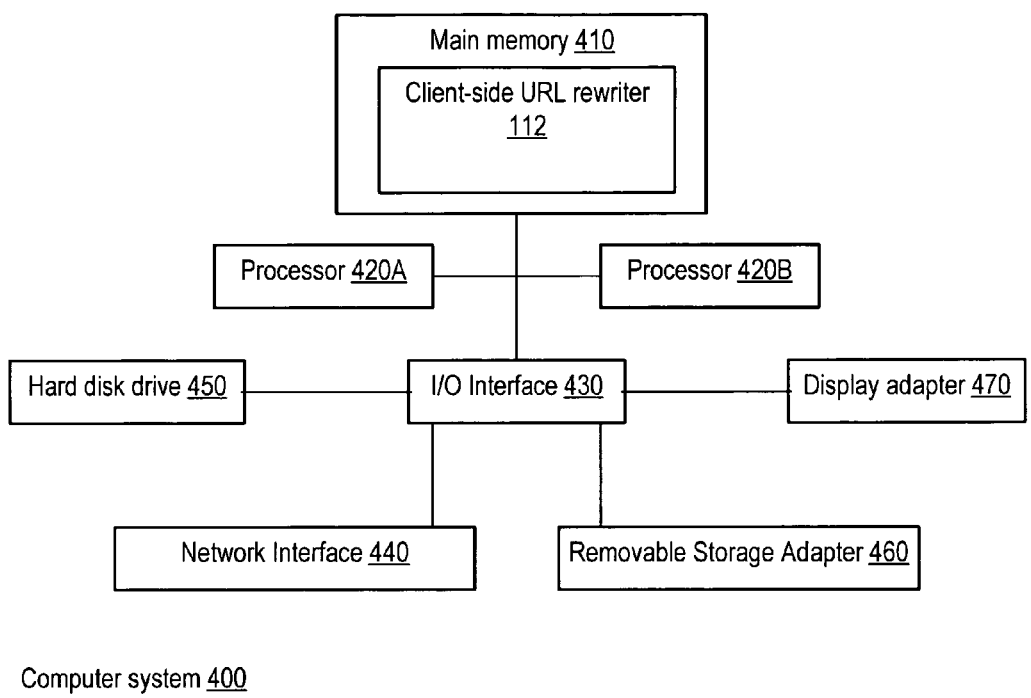
FIG. 4 is a block diagram of one embodiment of a computer system.

Turning now to FIG. 4, a hardware overview of exemplary computer system 400 is shown. Computer system 400 includes main memory 410, which is coupled to multiple processors 420A-B, and I/O interface 430. It is noted that the number of processors is purely illustrative, and that one or more processors may be resident on the node. I/O interface 430 further connects to network interface 440, hard disk drive 450, removable storage adapter 460, and display adapter 470. Such a system is exemplary of a laptop, desktop, server, or workstation. Processors 420A-B may be representative of any of various types of processors such as an x86 processor, a PowerPC processor or a CPU from the SPARC family of RISC processors. Likewise, main memory 410 may be representative of any of various types of memory, including DRAM, SRAM, EDO RAM, DDR SDRAM, Rambus RAM, etc., or a non-volatile memory such as a magnetic media, e.g., a hard drive, or optical storage. It is noted that in other embodiments, main memory 410 may include other types of suitable memory as well, or combinations of the memories mentioned above.

As described in detail above in conjunction with FIGS. 1-3, processors 420A-B of computer system 400 may execute software configured to perform the functions of client-side URL rewriter 112. The software may be stored in memory 410 of computer subsystem 400 in the form of instructions and/or data that implement the operations described above. Alternatively or additionally, computer system 400 may be operable to execute browser 110, reverse proxy server 120A-B, firewall 130A-B, intranet server 140A-C, or client proxy 300.

It is further noted that any of the embodiments described above may further include receiving, sending or storing instructions and/or data that implement the operations described above in conjunction with FIGS. 1-3 upon a computer accessible medium. Generally speaking, a computer accessible medium may include storage media or memory media such as magnetic or optical media, e.g. disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
  a client sending an initial request for content to a reverse proxy connected to one or more intranet servers configured to serve the content;
  in response to sending the initial request, receiving from the reverse proxy, data usable to implement a client-side URL rewriter, wherein the URL rewriter is operable to act as a client proxy for requests directed to any of the one or more intranet servers;
  the client sending a request for content to the client-side URL rewriter, wherein the request for content comprises a URL identifying one of the intranet servers;
  the client-side URL rewriter rewriting the URL, wherein the rewritten URL identifies the reverse proxy;
  the client-side URL rewriter sending a redirect response code with the rewritten URL back to the same client that sent the request to the client-side URL rewriter; and
  in response to receiving the rewritten URL and redirect response code, the same client redirecting the request for content to the reverse proxy indicated by the rewritten URL, wherein the redirected request is not sent to the URL rewriter.

2. The method of claim 1, wherein the client is configured so that all requests for content having a URL corresponding to the intranet server are sent to a client proxy comprising the client-side URL rewriter.

3. The method of claim 2, wherein the request for content is sent to the client proxy based on a proxy auto-configuration (PAC) of a browser application on the client.

4. The method of claim 1 further comprising, in response to receiving the data usable to implement the client-side URL rewriter, installing the client-side URL rewriter on a computer separate from the client.

5. The method of claim 1, wherein the rewritten URL includes an indication of the URL.

6. The method of claim 1, wherein the client-side URL rewriter is responsive to requests from the client and from one or more other clients over a client-side network.

7. The method of claim 1, wherein the method further comprises:
  the reverse proxy server retrieving content from an intranet server in accordance with the request for content; and
  the reverse proxy server returning said content to the client.

8. The method of claim 1, wherein redirecting the request for content to a reverse proxy server comprises:
  a client proxy comprising the client-side URL rewriter returning the rewritten URL to a browser; and
  the client proxy sending a redirect command to the browser.

9. A computer system, comprising:
  a processor;
  memory coupled to the processor and storing program instructions executable by the processor to implement:
    a client sending an initial request for content to a reverse proxy connected to one or more intranet servers configured to serve the content;
    in response to sending the request, receiving from the reverse proxy, data usable to implement a client-side URL rewriter, wherein the URL rewriter is operable to act as a client proxy for requests directed to any of the one or more intranet servers;
    the client sending a request for content to the client-side URL rewriter, wherein the request for content comprises a URL identifying one of the intranet servers;
    the client-side URL rewriter rewriting the URL, wherein the rewritten URL identifies the reverse proxy;
    the client-side URL rewriter sending a redirect response code with the rewritten URL back to the same client that sent the request to the client-side URL rewriter; and
    in response to receiving the rewritten URL and redirect response code, the same client redirecting the request for content to the reverse proxy indicated by the rewritten URL, wherein the redirected request is not sent to the URL rewriter.

10. The system of claim 9, wherein the client is configured to send all requests for content having URLs corresponding to the intranet server to a client proxy comprising the client-side URL rewriter.

11. The system of claim 10, further comprising a proxy auto-configuration (PAC) file configured to indicate that the request for content should be sent to the client proxy from a browser application on the client.

12. The system of claim 9, wherein the client-side URL rewriter is installed on a computer separate from the client.

13. The system of claim 9, wherein the rewritten URL includes an indication of the URL.

14. The system of claim 9, wherein the client-side URL rewriter is responsive to requests from the client and from one or more other clients over a client-side network.

15. The system of claim 9, wherein the reverse proxy server is further configured to:
retrieve the content identified by the request for content, from the intranet server; and
return the identified content to the client.

16. The system of claim 9, wherein the client-side URL rewriter is operable to redirect the request for content to a reverse proxy server by:
returning the rewritten first URL to a browser; and
sending a redirect command to the browser.

17. A non-transitory computer accessible storage medium storing program instructions computer executable to implement a method comprising:
a client sending an initial request for content to a reverse proxy connected to one or more intranet servers configured to serve the content;
in response to sending the initial request, receiving from the reverse proxy, data usable to implement a client-side URL rewriter, wherein the URL rewriter is operable to act as a client proxy for requests directed to any of the one or more intranet servers;
the client sending a request for content to the client-side URL rewriter, wherein the request for content comprises a URL identifying one of the intranet servers;
the client-side URL rewriter rewriting the URL, wherein the rewritten URL identifies the reverse proxy server;
the client-side URL rewriter sending a redirect response code with the rewritten URL back to the same client that sent the request to the client-side URL rewriter; and
in response to receiving the rewritten URL and redirect response code, the same client redirecting the request for content to the reverse proxy indicated by the rewritten URL, wherein the redirected request is not sent to the URL rewriter.

18. The computer accessible medium of claim 17, wherein the client is configured so that requests for content comprising URLs corresponding to the intranet server are sent to a client proxy comprising the client-side URL rewriter.

19. The computer accessible medium of claim 18, wherein the request for content is sent to the client proxy based on a proxy auto-configuration (PAC) of a browser application on the client.

20. The computer accessible medium of claim 17, wherein the client-side URL rewriter is installed on a computer separate from the client.

21. The computer accessible medium of claim 17, wherein the rewritten URL includes an indication of the URL.

22. The computer accessible medium of claim 21, wherein the client-side URL rewriter is responsive to requests from the client and from one or more other clients over a client-side network.

23. The computer accessible medium of claim 17, wherein redirecting the request for content to a reverse proxy server comprises:
the client-side URL rewriter returning the rewritten first URL to a browser; and
the client-side URL rewriter sending a redirect command to the browser.

* * * * *